United States Patent
Kuppusamy et al.

(10) Patent No.: US 6,527,975 B1
(45) Date of Patent: Mar. 4, 2003

(54) MINERAL OXIDE LIQUID CONCENTRATES FOR WATER AND WASTEWATER TREATMENT

(75) Inventors: Ilangovan Kuppusamy, Mexico City (MX); Ranjani Krishnan Ilangovan, Mexico City (MX)

(73) Assignee: Minox Corporation USA, Huntington Beach, CA (US)

( * ) Notice: Subject to any disclaimer, the term of this patent is extended or adjusted under 35 U.S.C. 154(b) by 0 days.

(21) Appl. No.: 09/648,900

(22) Filed: Aug. 25, 2000

Related U.S. Application Data

(63) Continuation-in-part of application No. 09/489,313, filed on Jan. 21, 2000, now abandoned.

(30) Foreign Application Priority Data

Dec. 2, 1999 (MX) .............................................. 9901848

(51) Int. Cl.[7] .............................. C09F 5/02; A01N 59/06
(52) U.S. Cl. ........................ 252/175; 75/746; 252/179; 424/684; 210/716
(58) Field of Search ................................ 252/175, 179, 252/378 P; 75/712, 743; 501/150; 423/117; 424/684

(56) References Cited

U.S. PATENT DOCUMENTS

| | | | | | |
|---|---|---|---|---|---|
| 1,415,346 A | * | 5/1922 | Hayward et al. | ............ | 423/117 |
| 2,023,426 A | * | 12/1935 | Lasley | ......................... | 501/150 |
| 3,427,127 A | * | 2/1969 | McCollum | ............... | 252/378 R |
| 4,024,087 A | | 5/1977 | Lainer et al. | ................ | 252/179 |
| 4,035,259 A | * | 7/1977 | Casale | .......................... | 252/175 |
| 4,448,696 A | | 5/1984 | White, Jr. | .................... | 210/711 |
| 4,519,921 A | | 5/1985 | Russ et al. | ................... | 210/716 |
| 5,346,643 A | * | 9/1994 | Kuno | ........................... | 252/175 |
| 5,520,820 A | | 5/1996 | Moody et al. | ............... | 210/734 |
| 5,681,475 A | | 10/1997 | Lamensdorf et al. | ........ | 210/666 |
| 5,683,707 A | * | 11/1997 | Johnson | ................... | 424/684 X |
| 5,900,258 A | * | 5/1999 | Engler | ........................ | 424/684 |

FOREIGN PATENT DOCUMENTS

| EP | 0 773 319 A1 | 5/1997 |
|---|---|---|
| EP | 0 783 245 B1 | 11/1998 |
| JP | 62234511 | 10/1987 |
| JP | 63044993 | 2/1988 |
| WO | 94/21349 | 9/1994 |

* cited by examiner

Primary Examiner—Richard D. Lovering
(74) Attorney, Agent, or Firm—Christie, Parker & Hale, LLP

(57) ABSTRACT

A process for making a mineral oxide concentrate useful as a flocculent, coagulant and/or disinfectant for the treatment of water and wastewater comprises extracting minerals from a natural mineral deposit rich in aluminum, magnesium, potassium and iron; reducing the particle size of the extracted material to a fine particle size, followed by heat treating the resulting mineral-rich material in air to produce a controlled expansion of the material and to oxidize essentially all organic constituents and to evaporate all water, leaving a mass of expanded dried mineral oxide-rich material containing oxides of aluminum, magnesium, potassium and iron. The expanded oxide-rich material is dissolved in a liquid carrier, preferably an alkaline solution, but an acidic solution also can be used, to produce a concentrate in which the mineral oxides are available and useful for said water and wastewater treatment.

38 Claims, No Drawings

MINERAL OXIDE LIQUID CONCENTRATES FOR WATER AND WASTEWATER TREATMENT

CROSS REFERENCE TO RELATED APPLICATIONS

This application is a continuation-in-part of U.S. application Ser. No. 09/489,313, filed Jan. 21, 2000, now abandoned, which claims priority from Mexican Patent Application Nos. 991848, filed Feb. 25, 1999, and 9901848, filed Dec. 2, 1999.

FIELD OF THE INVENTION

This invention relates to the purification of water and wastewater such as municipal and industrial wastewater, and more particularly, to a liquid mineral oxide concentrate obtained from processing minerals extracted originally from natural deposits rich in various minerals, particularly aluminum, magnesium, potassium and iron.

BACKGROUND OF THE INVENTION

The present invention has diverse applications in the environmental field to treat drinking water and industrial and municipal wastewaters to preserve the water quality. There are many processes for the treatment of water and wastewaters. The conventional water treatment processes comprise coagulation chemicals, such as aluminum and ferric salts, or the polyelectrolytes. Coagulation and rapid filtration are good to remove dissolved organic content by suitable chemical compositions. Disinfection has been used for a long time as a first treatment step before coagulation to oxidize ammonia and to disinfect the water. It has proved to be significant for the particle removal from waste waters and it has been abandoned widely due to the formation of toxic chlorinated products like trihalomethanes or haloacetic acids. Drinking water and wastewater treatments in urban areas include chemical treatment in the form of coagulation, flocculation installations such as dosing equipment, rapid mixing and slow flocculation chambers, and sludge removal and filtration followed by disinfection. However, a major portion of the world's population has no access to the supply of water treatment chemicals.

Heavy metal contamination exists in effluents of many industries such as printed circuit boards, metal finishers, mining operations, land fill leachates, tanneries and other metal processing industries. Metals are not biodegradable but are bio-accumulative. Cadmium, chromium, lead, mercury and arsenic are known to cause various health disorders and diseases. Most of the metals pose a risk of metal contamination in surface and ground water resources. The following industries are the main sources of heavy metal contamination: metal finishers; stainless steel, automobile, aircraft and semiconductor industries; paper mills; tanneries; mining facilities; appliance manufacturing; inorganic chemical manufacturing; metal based pigments and dyes production; defense related industries; and dye house waste. Industrial wastewater containing heavy metals is generally treated with the following treatment technologies: precipitation, co-precipitation, adsorption, ion exchange, membrane separation reverse osmosis or electrodialysis, or combinations of two or more of these technologies. Other treatments for removing inorganic contaminants include distillation, evaporation, oxide-reduction, air stripping, and biological treatment.

Most metal finishers use physicochemical treatment systems comprising coagulation, flocculation and sedimentation, followed by filtration for effective removal of suspended solids and heavy metals using aluminum sulfate, calcium hydroxide, ferric chloride or ferrous sulfate as coagulants along with an organic polymer as a flocculent aid. However, most physicochemical treatment plants generate high volumes of sludge production associated with poor performance in the removal of copper, chromium, and nickel, and thus do not fulfill the strict effluent discharge limits imposed by state and federal environmental protection agencies. At the present time, dried sludge disposal cost is approximately $1.7–2.5/lb; operating and chemical cost is approximately $2.95/1000 gallons.

In general, the metal plating industries do not reuse treated wastewater in the plating process because of the unacceptable quality of the treated water.

The present invention addresses these concerns by providing liquid mineral oxide concentrates useful for water and wastewater treatment with the objective to flocculate, disinfect and/or oxidize the dissolved and suspended toxic materials. Improvements in treatment of drinking water, removal of heavy metals and treatment of municipal sewage wastewater are provided. The invention provides superior results, when compared with other known methods of water purification, at a fraction of the cost, since the starting material is a readily available natural mineral resource.

SUMMARY OF THE INVENTION

Briefly, one embodiment of the invention comprises a process for making a liquid mineral oxide concentrate useful as a flocculent, coagulant and/or disinfectant for the treatment of water and wastewater. The starting material for the process is extracted from a natural mineral resource, preferably a mineral deposit rich in aluminum, magnesium, potassium and iron. One such mineral deposit is of volcanic and marine origin in which the soil contains a natural mixture of zeolites (aluminosilicates such as Clinoptilolites) and perlites and with significant concentrations of aluminum, magnesium, potassium and iron. The minerals extracted from the natural mineral deposit are reduced in particle size and then heat treated by heating them in air to produce a controlled expansion of the starting material, leaving an expanded mass of mineral oxide-rich material. This includes oxides of aluminum, iron, magnesium and potassium. The heat treatment expands the particles several hundred times in size; but the heat treatment also is necessary to remove all organic constituents and water molecules from the expanded material. The expanded mineral oxide-rich material is then dissolved in a liquid carrier in which the expanded mineral oxides are soluble. This forms a solution which can either be alkaline or acidic and which contains the dissolved mineral oxides. This mineral oxide-containing solution can be used in various concentrations in the treatment of water and wastewater, including industrial and municipal wastewater.

DETAILED DESCRIPTION

The starting material for the invention comprises a natural mineral deposit primarily containing aluminum, iron and magnesium. Such natural mineral deposits also preferably :include potassium and calcium. One mineral deposit useful for this invention is located 300 km northeast of Mexico City, Mexico. This mineral deposit is of volcanic and marine origin. A typical elemental composition (active components) of this mineral deposit is set forth in Table 1 below. (Silicon is the predominant mineral but is not an active component of the starting material.) The elemental composition of the starting material comprises about 5% to about 7% iron, about 7% to about 9% aluminum, about 4% to about 6% magnesium and about 3% to about 5% potassium. The preferred starting material is a Clinoptilolite-type material having an aluminum to silica ratio of about 0.4 to about 0.6 by weight. The ratio of aluminum to iron for such material is greater than about 1.0 and is more preferably about 1.2 to about 1.4 by weight. The elemental components of the starting material are typically iron ore, aluminosilicates, magnesium trapped by aluminum and potassium oxide. Other similar mineral deposits also believed to be useful in practicing this invention are located in various parts of Russia, including the St. Petersburg area, Italy, Austria and Arizona.

TABLE 1

ELEMENTAL COMPOSITION OF THE MINERAL

| | |
|---|---|
| Fe | 6% |
| Al | 8% |
| Mg | 5% |
| Ca | 0.1% |
| K | 4% |

Values are average of three different samples of X ray diffraction analysis of the mineral The raw material obtained from the mines is transported as rocks of different sizes typically ranging from 15–30 cm in diameter. They are pulverized using a mechanical device and then sieved to 50 to 100 mesh before heat treatment.

The sieved materials are heat treated preferably by heating in air in an electric oven in a temperature range generally from about 800° to 1500° C., to expand the minerals, to fuse the minerals and to eliminate all organic constituents from the minerals. The heat treatment is also intended to evaporate the entire molecular water content of the material in addition to all organics. The evaporated constituents are non-toxic and can be evaporated into the air.

The mineral product is expanded to several hundred times its original size in a manner similar to the heat treatment expansion of popcorn, leaving the minerals in the form of Low density mineral oxides.

Expansion of the oxide-rich mineral varies with temperature. In one high temperature treatment experiment, sieved materials were treated at various temperatures to determine the amount of expansion (measured in vol/vol). Test results also were measured for different particle sizes varying from coarse, 50 mesh, up to fine, 200 mesh:

TABLE 2

| | % Expansion at 400° C. | % Expansion at 800° C. | % Expansion at 1200° C. | % Expansion at 1500° C. |
|---|---|---|---|---|
| 50 mesh | 1 | 200 | 220 | 200 |
| 100 mesh | 1 | 200 | 210 | 150 |
| 150 mesh | 1 | 200 | 205 | 120 |
| 200 mesh | 1 | 200 | 201 | 85 |

This table shows the amount of expansion that occurs under heat treatment. However, maximum volume expansion is not the objective. Temperatures above about 400° C. will volatilize the unwanted organic constituents. A completely dried expanded end-product is necessary to ensure that no water is bound to the metal oxides which remain in the expanded end-product. Table 2 shows the effects of temperature increases with desired expansion of the mineral product. Temperatures in the range of about 800° to 900° C. are preferred. For the mineral deposits obtained from the Mexico City vicinity, a temperature of 857° C. is the desired heat treatment temperature. Each raw material however will have a precise temperature which is most preferred for producing the desired metal oxides; and the heat treatment temperature must critically stay constant, within about ±3° C. during heat treatment. If the heat treatment temperature is too low, expansion may be too low and undesired water content may remain. If heat is excessive the material can undergo undesired charring or reduced expansion, calcination, denaturing, or otherwise cause undesired changes in the chemical properties of the elements. For instance, undesired metal or glass could be produced from excessive heat. Such undesired heat treatment also may create undesired insoluble anionic constituents such as carbonates, hydroxides, nitrates and sulfates.

The heat treatment produces an expanded product which contains the desired soluble mineral oxides such as aluminum oxide, magnesium oxide, potassium oxide, iron oxide, silicon oxide and a small amount of calcium oxide, as its principal oxide constituents. It is desired to produce these mineral oxides because they can be dissolved in the liquid carrier to form an alkaline solution or acidic solution of the mineral oxides. The desired alkaline solution is produced by dissolving the expanded mineral oxides in sodium hydroxide, whereas an acidic mineral oxide concentrate solution can be produced by dissolving the mineral oxides in sulfuric acid or hydrochloric acid. At the present time it is preferred that an alkaline solution of mineral oxides be produced preferably using sodium hydroxide. If the starting material has been excessively heated, resulting in chemical changes, the resulting constituents will not dissolve. For instance, improper heat treatment may produce metal hydroxides which are insoluble in the concentrate liquids, and therefore production of dissolvable mineral oxides from the heat treatment step is the objective.

After heat treatment the material is cooled to room temperature prior to digestion in which the mineral oxide-rich expanded material is dissolved in the liquid carrier to form a liquid solution that contains the mineral oxides. A presently preferred method comprises dissolving the oxide-rich expanded material in a strong alkaline liquid such as sodium hydroxide, preferably 50% NaOH: oxide material vol/vol digestion at 130° C. The preferred pH of the resulting solution is about 10 to about 11, with a specific gravity of about 1.50. The oxide-rich material has a solubility in sodium hydroxide depending upon digestion temperature. The following Table 3 shows this solubility relationship. The desired solubility of about 3% occurs at a desired temperature of about 130° C.

TABLE 3

Solubility of Minerals with NaOH at Different Temperatures

| Temperature (° C.) | Solubility (%) |
|---|---|
| 50 | 0.1 |
| 80 | 0.1 |
| 120 | 2 |
| 150 | 4 |
| 180 | 4 |
| 210 | 4 |

As an alternative digestion process, the mineral oxide-rich expanded material can be dissolved in a strong acid such as sulfuric acid. In this embodiment the pH is adjusted to within the range of about 5.5. to 7, preferably 6.5, with a specific gravity of about 1.17.

A presently preferred mineral oxide liquid concentrate using NaOH as the dissolving medium was prepared according to the procedures described above. Table 4 below shows the physical and chemical properties of the resulting product.

Various types of water and wastewater were treated with the concentrated mineral oxide solution, and the results are reported in Tables 5, 6 and 7 below.

Drinking water was treated with different concentrations (in ppm) of the mineral oxide-rich concentrated liquid. Table 5 shows the effects of different dosages on the treatment of drinking water. The oxide-rich material was dissolved in sodium hydroxide in this example. This treatment disinfected the water, and treated water was obtained that was completely devoid of any pathogenic microbes, devoid of any residual concentrations of heavy metal or faecal coliforms, and supplemented basic nutrients (Na, Mg, K) in the drinking water. Although the table shows concentrations between 50 ppm and 100 ppm, drinking water can be treated with concentrations of the mineral oxide material from about 50 to about 250 mg/l.

For wastewater treatment good results are obtained by initially filtering to remove suspended solids. The wastewater is then pretreated by neutralizing it to adjust its pH to a range of about 6.5 to 7.5 preferably using sodium hydroxide or sulfuric acid in the adjustment process.

Generally speaking, for raw wastewater the mineral oxide material is introduced by preferably mixing 100 to 300 ppm for about 1 to 15 minutes for complete dissolution.

In one embodiment about 100 to about 300 mg/l of the mineral oxide concentrate was added to treat industrial wastewater such as for metal finishing, chemical and petrochemical and azo dyes removal, and agro industrial waste or municipal wastewater containing dissolved organics and heavy metals.

TABLE 4

Physicochemical Characteristics of Mineral Oxide Concentrate

| PARAMETER | CONCENTRATION RANGE | MEAN CONCENTRATION* |
|---|---|---|
| Specific Gravity ($H_2O$ = 1) | 1.47–1.52 | 1.495 |
| Color | Light Brown | Light Brown |
| pH | 12.50–13.00 | 12.75 |
| Calcium (mg/L) | 46.0–55.0 | 50.5 |
| Magnesium (mg/L) | 87.0–110.0 | 98.5 |
| Aluminum (g/L) | 1.75–2.1 | 1.92 |
| Potassium (g/L) | 4.90–5.30 | 5.1 |
| Iron (mg/L) | 8.0–12.0 | 10.0 |
| Silicon (g/L) | 2.7–3.9 | 3.3 |
| Nickel (µg/L) | 2.23–2.25 | 2.24 |
| Copper (µg/L) | 5.64–5.75 | 5.69 |
| Cobalt (µg/L) | 6.30–6.70 | 6.50 |
| Molybdenum (mg/L) | 19.0–24.0 | 21.5 |
| Zinc (mg/L) | 28.0–36.0 | 32.0 |
| Sodium (g/L) | 296–320 | 308 |
| Arsenic (mg/L) | N.D | N.D. |
| Selenium (mg/L) | N.D | N.D. |
| Mercury (mg/L) | N.D | N.D. |
| Cadmium (mg/L) | N.D | N.D. |
| Vanadium (mg/L) | N.D | N.D. |
| Manganese (mg/L) | N.D | N.D. |
| Silver (mg/L) | N.D | N.D. |
| Chromium (mg/L) | N.D | N.D. |
| Lead (µg/L) | 3–5 | 4 |

*Values are average of five different samples of three different batch productions.
ND: Not detectable In another embodiment of the invention about 250 to about 450 mg/l of the mineral oxide concentrate was added to treat municipal leacheate waste.

During such treatment all minerals contained in the concentrate are precipitated from the treated water and are separately disposed of.

The tables below show the results of treating various types of wastewater. These include metal plating/metal finishing industrial wastewater (Table 6), and municipal sewage wastewater (Table 7).

Complete mixing of the mineral oxide concentrate with water and wastewater results in destabilization of colloidal particles and microscopic particles within a short period of time (1=5 min), with significant orthokinetic flocculation.

The flocs produced have higher rates of sedimentation (15–45 minutes) During coagulation and flocculation, the metal ions present in the mineral oxide material dissociate to yield trivalent actions that hydrate to form aquometal complexes that finally form polynuclear colloids which are highly absorbent with the surface of most negative colloids, reducing turbidity in wastewaters. Laboratory scale experiments reveal the mineral oxide concentrate acts as a potential disinfectant to eradicate pathogenic microbial populations. In drinking water treatments, the material not only removes faecal colifoms but also supplies basic mineral nutrients (Na, Mg and K). In industrial and municipal wastewater treatment, the dosage of the mineral oxide concentrate depends on the type of wastewater.

The present invention provides a new, economic and a natural mineral oxide material for water and wastewater treatment. The invention provides a coagulation and flocculation agent that on addition to wastewater destabilizes the suspended solids, followed by particle transport to promote collision between destabilized particles. The invention has a natural coagulation and flocculation agent with metal ions that dissociates to yield trivalent actions which hydrate to form aquametal complexes to finally form polynuclear colloids which are highly absorbent with the surface of most negative colloids, reducing turbidity in the wastewater. The invention also provides a coagulant which produces coagulated solids that are more insoluble than other conventional coagulants. Use of this invention helps in the complete removal of faecal coliforms and supplementation of basic mineral nutrients(sodium, magnesium and potassium) in drinking water treatment. The invention not only removes COD, BOD and coliforms from wastewaters and sewage efficiently, but it also eliminates phosphates and ammoniacal nitrogen. Wastewater treated with the invention has noticeable rapid, rigid, cosettled, coagulated precipitate or sludge. The sludge obtained is highly solid in nature and is rich in iron, aluminum, magnesium, nitrogen and phosphates. With adequate acid treatment all the metals can be recovered from the sludge. The invention also provides a potential disinfectant to eradicate pathogenic microbial populations including *Staphylococcus aureus,* pathogenic faecal coliforms, Salmonella, Vibrio cholera, Shigella spp. And Amoeba.

TABLE 5

DRINKING WATER TREATED WITH DIFFERENT CONCENTRATIONS OF MINERAL OXIDE CONCENTRATE

| PARAMETER | 0 PPM | 50 PPM | 75 PPM | 100 PPM |
|---|---|---|---|---|
| Aluminum (mg/L) | ND | ND | ND | ND |
| Ammonium (mg/L) | ND | ND | ND | ND |
| Arsenic (mg/L) | ND | ND | ND | ND |
| Barium (mg/L) | ND | ND | ND | ND |
| Boron (mg/L) | ND | ND | ND | ND |
| Cadmium (mg/L) | ND | ND | ND | ND |
| Calcium (mg/L)' | 0.01 | 0.02 | 0.02 | 0.03 |
| Chloride (mg/L) | 11010 | 85 | 60 | 55 |
| Chromium (mg/L) | ND | ND | ND | ND |
| Coliforms (org/100 ml) | 7 | ND | ND | ND |
| Color (CU) | 16 CU | ND | ND | ND |
| Copper (mg/L) | 1.2 | 0.6 | 0.4 | 0.3 |
| Fluoride (mg/L) | 1.0 | ND | ND | ND |
| Iron (mg/L) | 0.4 | 0.1 | 0.1 | 0.1 |
| Lead (mg/L) | 0.02 | ND | ND | ND |
| Magnesium (mg/L) | 0.1 | ND | ND | ND |
| Manganese (mg/L) | ND | ND | ND | ND |
| Mercury (mg/L) | ND | ND | ND | ND |
| Molybdenum (mg/L) | ND | ND | ND | ND |
| Nickel (mg/L) | ND | ND | ND | ND |
| Nitrates (mg/L) | 6.0 | 4.0 | 1.0 | 1.0 |
| Nitrites (mg/L) | ND | ND | ND | ND |
| pH | 6.5 | 6.7 | 6.9 | 7.5 |

TABLE 5-continued

DRINKING WATER TREATED WITH DIFFERENT
CONCENTRATIONS OF MINERAL OXIDE CONCENTRATE

| PARAMETER | 0 PPM | 50 PPM | 75 PPM | 100 PPM |
|---|---|---|---|---|
| Phosphorous (mg/L) | 0.2 | ND | ND | ND |
| Phenols (mg/L) | ND | ND | ND | ND |
| Potassium (mg/L) | 110 | 116 | 127 | 135 |
| Selenium (mg/L) | ND | ND | ND | ND |
| Silver (mg/L) | ND | ND | ND | ND |
| Sodium (mg/L) | 26 | 30 | 37 | 45 |
| Sulfate (mg/L) | ND | ND | ND | ND |
| Turbidity (NTU) | 0.5 NTU | 0.1 NTU | 0.1 NTU | 0.1 NTU |
| Zinc (mg/L) | 3.0 | 1.0 | ND | ND |

ND: Not detectable

TABLE 6

METAL PLATING/METAL FINISHING INDUSTRIAL
WASTEWATER USING MINERAL OXIDE CONCENTRATE
Sample site: Lynwood, California

| Physicochemical Characteristics | Untreated Sample (Control) | 100 ppm MINOX | 200 ppm MINOX | 300 ppm MINOX | 400 ppm MINOX | 500 ppm MINOX |
|---|---|---|---|---|---|---|
| pH | 8.5 | 8.7 | 9.4 | 9.9 | 10.3 | 10.5 |
| Turbidity (NTU) | 9.0 | .5 | 7.0 | 3.0 | 3.0 | 3.0 |
| Total Suspended Solids (mg/L) | 315 | 297 | 260 | 260 | 250 | 210 |
| Total Dissolved Solids (mg/L) | 1720 | 1695 | 1400 | 470 | 475 | 460 |
| Biological Oxygen Demand ($BOD_5$ (mg/L)) | 210 | 193 | 190 | 145 | 157 | 166 |
| Chemical Oxygen Demand (COD) (mg/L) | 984 | 942 | 753 | 674 | 689 | 693 |
| Total Iron (mg/L) | 214.00 | 126 | 57 | 2.4 | 1.3 | 1.0 |
| Total Zinc (mg/L) | 120.00 | 116 | 62 | 1.7 | 0.2 | 0.2 |
| Total Cadmium (mg/L) | 4.00 | 0.01 | 0.001 | N.D | N.D | N.D |
| Total Copper (mg/L) | 272 | 114.2 | 42 | 0.01 | 0.01 | 0.01 |
| Total Lead (mg/L) | 116 | 0.04 | N.D | N.D | N.D | N.D |
| Chromium (VI) (mg/L) | 189 | 134 | 65 | 0.6 | 0.01 | 0.01 |
| Total Nickel | 117 | 93 | 34 | 0.1 | 0.01 | 0.01 |

Note: All the samples were analyzed in triplicate and values are shown as average of three different samples. All the Physicochemical parameters were analyzed using APHA standard methods.

For the analysis of heavy metals Plasma (Inductively Coupled Plasma) Emission Spectrometer was used.

TABLE 7

MUNICIPAL SEWAGE WASTEWATER
USING MINERAL OXIDE CONCENTRATE
Sample site: Mexico City Sewage Wastewater

| Sewage waste sample (Control) Physicochemical Characteristics | Untreated sewage sample (Control) | 100 ppm MINOX | 200 ppm MINOX | 300 ppm MINOX | 400 ppm MINOX | 500 ppm MINOX |
|---|---|---|---|---|---|---|
| pH | 8.5 | 8.5 | 8.7 | 9.2 | 9.3 | 9.5 |
| Turbidity (NTU) | 9.0 | 8.0 | 6.0 | 2.0 | 2.0 | 2.0 |
| Total Suspended Solids (mg/L) | 450 | 210 | 170 | 79 | 80 | 77 |

TABLE 7-continued

MUNICIPAL SEWAGE WASTEWATER
USING MINERAL OXIDE CONCENTRATE
Sample site: Mexico City Sewage Wastewater

| Sewage waste sample (Control) Physicochemical Characteristics | Untreated sewage sample (Control) | 100 ppm MINOX | 200 ppm MINOX | 300 ppm MINOX | 400 ppm MINOX | 500 ppm MINOX |
|---|---|---|---|---|---|---|
| Total Dissolved Solids (mg/L) | 917 | 805 | 417 | 284 | 299 | 280 |
| Dissolved Oxygen (mg/L) | 3.1 | 4.2 | 4.6 | 4.5 | 4.5 | 4.5 |
| Biological Oxygen Demand (BODs) (mg/L) | 450 | 336 | 287 | 191 | 190 | 190 |
| Total Chemical Oxygen Demand (COD) (mg/L) | 619 | 413 | 326 | 173 | 189 | 193 |
| Total Iron (Fe) (mg/L) | 4.3 | 2.6 | 0.1 | 0.1 | 0.1 | 0.1 |
| Total Zinc (Zn) (mg/L) | 0.94 | 0.47 | 0.2 | 0.1 | 0.1 | 0.1 |
| Total Cadmium (Cd) (mg/L) | 0.73 | 0.1 | 0.1 | N.D | N.D | N.D |
| Total Copper (Cu) (mg/L) | 0.97 | 0.2 | 0.1 | N.D | N.D | N.D |
| Total Lead (Pb) (mg/L) | 1.89 | 0.04 | N.D | N.D | N.D | N.D |
| Total Mercury (mg/L) | 0.005 | N.D | N.D | N.D | N.D | N.D |
| Total Nickel (mg/L) | 0.04 | 0.03 | 0.01 | N.D | N.D | N.D |
| Sulfates (mg/L) | 220 | 131 | 55 | 45 | 40 | 42 |
| Nitrates (mg/L) | 93 | 51 | 17 | 17 | 11 | 10 |
| Chloride (mg/L) | 316 | 297 | 252 | 194 | 190 | 182 |
| Kjeldahl Nitrogen (mg/L) | 57 | 29 | 14 | 12 | 11 | 11 |
| Total Phosphorus (as P) (mg/L) | 32 | 27 | 12 | 10 | 10 | 10 |
| Total Fecal Coliforms (MPN/L) | $3.5 \times 10^8$ | $4.2 \times 10^6$ | $5.1 \times 10^5$ | $5.9 \times 10^4$ | $5.7 \times 10^4$ | $4.0 \times 10^4$ |

Note: All the samples were analyzed in triplicate and values are shown as average of three different samples. All the Physicochemical parameters were analyzed using American Public Health Association (APHA) standard methods. For the analysis of heavy metals Plasma (ICP) Emission Spectrometer was used.

Table 8 shows a comparison of the concentrate of the present invention with other conventional coagulants in their ability to remove certain dissolved contaminant materials from municipal wastewater. The table shows the efficiency in percentage removal of orthophosphate, coliforms and phosphates from the wastewater.

TABLE 8

Comparison of Mineral Oxide Concentrate with Conventional Coagulants for Treatment of Municipal Sewage Wastewater.

| PARAMETERS | MINERAL OXIDE CONCENTRATE 100 PPM | ALUMINUM SULFATE 200 PPM | FERRIC CHLORIDE 200 PPM | FERROUS SULFATE 200 PPM | CALCIUM HYDROXIDE 100 PPM |
|---|---|---|---|---|---|
| Total phosphates removal efficiency (%) | 92.3 | 59.7 | 61.7 | 70.3 | 74.6 |
| Total fecal coliforms removal efficiency (%) | 95.6 | 64.8 | 65.1 | 72.6 | 65.0 |
| Orthophosphates removal efficiency (%) | 94.6 | 62.5 | 63.8 | 59.4 | 73.5 |

We claim:

1. A process for making a liquid mineral oxide concentrate useful as a flocculent, coagulant and/or disinfectant for the treatment of water and wastewater, the process comprising extracting from a natural mineral deposit minerals at least containing aluminum, iron, magnesium, and potassium; heat treating the extracted mineral-rich material to produce a controlled volumetric expansion of the material and to remove essentially all organic constituents and to evaporate essentially all water, leaving a mass of expanded mineral-rich material at least containing oxides of aluminum, iron, magnesium and potassium; and dissolving the expanded oxide-rich material in a liquid to produce a liquid concentrate of said mineral oxide material useful for said water and wastewater treatment, in which the mineral-rich material is heat treated at a temperature ranging from 800°–1500° C. to fuse the minerals and complete dissolution of cations.

2. The process of claim 1 wherein said concentrate is in the form of an alkaline or acidic liquid solution and is highly soluble in water and contains Al, Fe, Mg, and K not in the form of metal salt, in which the alkaline or acidic solution contains Al, Fe, Mg and K as fusion of the cations produced at high temperature.

3. The process according to claim 2 wherein said Al, Fe, and Mg associate in the form of hydroxide species in the liquid alkaline form.

4. The process according to claim 1 in which the mineral oxide concentrate has a concentration range of-about 1.7 to about 2.1 gm/L aluminum, about 87 to about 110 mg/L magnesium, about 8 to about 12 mg/L iron, and about 4.9 to about 5.3 g/L potassium.

5. The process according to claim 1 in which said liquid concentrate is an alkaline solution.

6. The process according to claim 1 in which a bulk ion exchange is caused by a Clinoptilolite characteristic of the extracted mineral.

7. The process according to claim 1 in which an inorganic trivalent of aluminum and iron salt cations serve as an effective coagulant and flocculent, and the combined effects of other metal cations in the liquid generate molecular oxygen to act as the disinfectant.

8. The process according to claim 1 in which the liquid concentrate contains cations of Al, Fe, K and Mg and its concentration ranges from about 2% to about 4% by weight.

9. The process according to claim 1 including the step of reducing the particle size of the extracted minerals prior to the heat treatment step.

10. The process according to claim 1 in which the pH of the concentrate is in the range of about 11 to about 13.

11. The process according to claim 1 in which the mineral-rich material is of volcanic and marine origin.

12. The process according to claim 1 in which the heat treatment step is carried out at a temperature within the range of about 800° to 900° C.

13. The process according to claim 1 in which the elemental composition of the mineral-rich material comprises about 5% to about 7% iron, about 7% to about 9% aluminum, about 4% to about 6% magnesium and about 3% to about 5% potassium.

14. The process according to claim 1 in which the mineral-rich material comprises a Clinoptilolite-type material.

15. The process according to claim 14 in which heat treatment is carried out at a temperature in the range of about 854° to 861° C.

16. The process according to claim 1 in which the mineral-rich material has an aluminum to silica ratio of about 0.4 to about 0.6 by weight.

17. The process according to claim 1 in which the mineral-rich material has an aluminum to iron ratio of greater than 1.0.

18. The process according to claim 1 in which solubility of the mineral is about 2% to 4% in sodium hydroxide at a temperature in the range of about 100° to 200° C.

19. The process according to claim 1 in which the iron, aluminum, potassium and magnesium constituents are expanded during the heat treatment to a volume at least about 200% greater than of the volume of the original material prior to heat treatment.

20. A mineral oxide concentrate useful as a flocculent, coagulant and/or disinfectant for the treatment of water and wastewater, comprising oxides of aluminum, iron, magnesium and potassium dissolved in a liquid carrier solution, in which said mineral oxides have been extracted from a natural mineral deposit starting material heat treated to produce a volumetrically expanded oxide-containing material from which organic constituents and water naturally present in the starting material have been removed by said heat treatment, in which the starting material is heat treated at a temperature ranging from 800° to 1500° C. to fuse the minerals and complete dissolution of cations, said expanded material being dissolvable in a liquid solution to provide said mineral oxide concentrate.

21. The mineral oxide concentrate of claim 20 in which the mineral oxide concentrate has a concentration range of about 1.7 to about 2.1 gm/L aluminum, about 87 to about 110 mg/L magnesium, about 8 to about 12 mg/L iron, and about 4.9 to about 5.3 g/L potassium.

22. The mineral oxide concentrate of claim 20 in which the elemental composition of the starting material comprises about 5% to about 7% iron, about 7% to about 9% aluminum, about 4% to about 6% magnesium and about 3% to about 5% potassium.

23. A process for making a liquid mineral oxide concentrate useful as a flocculent, coagulant and/or disinfectant for the treatment of water and wastewater, the process comprising extracting from a natural mineral deposit minerals at least containing aluminum, iron, magnesium, and potassium; heat treating the extracted mineral-rich material to produce a controlled volumetric expansion of the material and to remove essentially all organic constituents and to evaporate essentially all water, leaving a mass of expanded mineral-rich material at least containing oxides of aluminum, iron, magnesium and potassium; and dissolving the expanded oxide-rich material in a liquid to produce a liquid concentrate of said mineral oxide material useful for said water and wastewater treatment, in which the mineral oxide concentrate has a concentration range of about 1.7 to about 2.1 gm/L aluminum, about 87 to about 110 mg/L magnesium, about 8 to about 12 mg/L iron, and about 4.9 to about 5.3 g/L potassium, and in which said liquid concentrate is an alkaline solution.

24. The process of claim 23 wherein said concentrate is highly soluble in water and contains Al, Fe, Mg, and K not in the form of metal salt, in which the alkaline solution contains Al, Fe, Mg and K as fusion of the cations produced at high temperature.

25. The process according to claim 23 in which the liquid concentrate contains cations of Al, Fe, K and Mg and its concentration ranges from about 2% to about 4% by weight.

26. The process according to claim 23 including the step of reducing the particle size of the extracted minerals prior to the heat treatment step.

27. The process according to claim 23 in which the pH of the concentrate is in the range of about 11 to about 13.

28. The process according to claim 23 in which the mineral-rich material is of volcanic and marine origin.

29. The process according to claim 23 in which the heat treatment step is carried out at a temperature within the range of about 800° to 900° C.

30. The process according to claim 23 in which the elemental composition of the mineral-rich material comprises about 5% to about 7% iron, about 7% to about 9% aluminum, about 4% to about 6% magnesium and about 3% to about 5% potassium.

31. The process according to claim 23 in which the mineral-rich material comprises a Clinoptilolite-type material.

32. The process according to claim 23 in which the mineral-rich material has an aluminum to silica ratio of about 0.4 to about 0.6 by weight.

33. The process according to claim 23 in which the mineral-rich material has an aluminum to iron ratio of greater than 1.0.

34. The process according to claim 23 in which solubility of the mineral is about 2% to 4% in sodium hydroxide at a temperature in the range of about 100° to 200° C.

35. The process according to claim 23 in which the iron, aluminum, potassium and magnesium constituents are expanded during the heat treatment to a volume at least about 200% greater than of the volume of the original material prior to heat treatment.

36. A mineral oxide concentrate useful as a flocculent, coagulant and/or disinfectant for the treatment of water and wastewater, comprising oxides of aluminum, iron, magnesium and potassium dissolved in a liquid carrier solution, in which said mineral oxides have been extracted from a natural mineral deposit starting material heat treated to produce a volumetrically expanded oxide-containing material from which organic constituents and water naturally present in the starting material have been removed by said heat treatment, said expanded material being dissolvable in a liquid solution to provide said mineral oxide concentrate, in which the mineral oxide concentrate has a concentration range of about 1.7 to about 2.1 gm/L aluminum, about 87 to about 110 mg/L magnesium, about 8 to about 12 mg/L iron, and about 4.9 to about 5.3 g/L potassium, and in which said liquid concentrate is an alkaline solution.

37. The mineral oxide concentrate of claim 36 in which the elemental composition of the starting material comprises about 5% to about 7% iron, about 7% to about 9% aluminum, about 4% to about 6% magnesium and about 3% to about 5% potassium.

38. The mineral oxide concentrate according to claim 36 in which heattreating the mineral-rich starting material is conducted at a temperat from 800°–1500° C. to fuse the minerals and complete dissolution of cations.

* * * * *

UNITED STATES PATENT AND TRADEMARK OFFICE
CERTIFICATE OF CORRECTION

PATENT NO. : 6,527,975 B1
DATED : March 4, 2003
INVENTOR(S) : Kuppusamy et al.

It is certified that error appears in the above-identified patent and that said Letters Patent is hereby corrected as shown below:

Title page,
Item [30], Foreign Application Priority Data, insert
-- Feb. 25, 1999 (MX) ......991848 --

Column 11,
Line 13, delete "of-about" insert -- of about --
Line 21, delete "serve" insert -- serves --

Column 14,
Lines 12-13, delete "heattreating the mineral-rich starting material is conducted at a temperat from", insert -- heat treating the mineral-rich starting material is conducted at a temperature ranging from --

Signed and Sealed this

Fifth Day of April, 2005

JON W. DUDAS
*Director of the United States Patent and Trademark Office*